United States Patent [19]

Ina et al.

[11] Patent Number: 4,665,745
[45] Date of Patent: May 19, 1987

[54] HEAT WIRE TYPE AIR FLOWRATE MEASURING APPARATUS

[75] Inventors: Katsuhiro Ina, Okazaki; Yoshihisa Sato, Nagoya; Masumi Kinugawa, Okazaki; Atsushi Suzuki, Oobu; Katsunori Ito, Ama; Susumu Akiyama, Kariya; Tiaki Mizuno, Toyota; Toshitaka Yamada; Tomoaki Abe, both of Nagoya, all of Japan

[73] Assignee: Nippondenso Co., Ltd., Kariya, Japan

[21] Appl. No.: 729,852

[22] Filed: May 2, 1985

[30] Foreign Application Priority Data

| May 7, 1984 [JP] | Japan | 59-90405 |
| Oct. 26, 1984 [JP] | Japan | 59-225323 |
| Oct. 26, 1984 [JP] | Japan | 59-225325 |

[51] Int. Cl.$^4$ ............................ G01F 1/68
[52] U.S. Cl. ............................ 73/204; 73/118.2
[58] Field of Search .............. 73/118, 204; 123/494

[56] References Cited

U.S. PATENT DOCUMENTS

| 3,803,913 | 4/1974 | Tracer | 73/204 |
| 3,928,800 | 12/1975 | Strenglein | 73/204 X |
| 4,043,195 | 8/1977 | Hunting | 73/204 |
| 4,334,186 | 6/1982 | Sasayama et al. | 73/204 X |
| 4,565,091 | 1/1986 | Ito et al. | 73/204 |

FOREIGN PATENT DOCUMENTS

| 55-104538 | 8/1980 | Japan. | |
| 56-51618 | 5/1981 | Japan. | |
| 0087421 | 5/1983 | Japan | 73/204 |

*Primary Examiner*—Herbert Goldstein
*Attorney, Agent, or Firm*—Cushman, Darby & Cushman

[57] ABSTRACT

An air flowrate measuring apparatus with a heat wire measures the flow rate of the air flowing through the intake pipe of an engine. The apparatus has a temperature sensitive element which has a specific temperature-resistance characteristic and is disposed in the intake pipe. Constant heating voltage is applied to this element in response to a start signal, thus heating the element. When the temperature of the element rises to a specified value, the application of the voltage is stopped. At the same time, a pulse signal whose width corresponds to the period of applying the voltage is generated. The signal is supplied to an interface circuit through a drive circuit driven by a reference voltage which has been also used to control the heating voltage. The interface circuit comprises two wave-shaping circuits. The first wave-shaping circuit has a filter means of a small integration time constant. The second wave-shaping circuit has a filter means whose integration time constant is large enough to remove noise from the input signal.

20 Claims, 15 Drawing Figures

HEAT WIRE TYPE AIR FLOWRATE MEASURING APPARATUS

BACKGROUND OF THE INVENTION

The present invention relates to an air flowrate measuring apparatus using a heat wire having a temperature-resistance characteristic, which is intended to measure the intake air flowrate into an engine corresponding to the operational conditions of, for example, an internal combustion engine when the same is electronically controlled. The flowrate of the air being measured from the heat-dissipation characteristic of said measuring element, the resultant measurement signal being supplied to an electronic control unit of the internal combustion engine as one of various measurement signals produced for monitoring the operational conditions of the engine.

Monitoring means include engine-revolution detecting means, engine-temperature detecting means, exhaust gas detecting means, etc., and various types of intake air flowrate measuring/detecting means, as means having a direct connection with the operational conditions of the engine.

In a heat wire type air flowrate measuring apparatus, a temperature sensitive element is used which is constituted by a resistance wire having a temperature-resistance characteristic wherein the resistance value varies with the temperature. This temperature sensitive element is fixedly disposed within an intake pipe. To the temperature sensitive element, heating power is supplied to cause it to generate heat. While the heat dissipation of the temperature sensitive element varies depending upon the flowrate of air flowing through the intake pipe, it is detected from the variations in temperature of the temperature sensitive element. A measured air flowrate is represented or expressed by the resultant detection signal. Such an output measurement signal is given, for example, in the form of a pulse-like signal in which there is expressed a time width corresponding to the measured air flowrate.

An electronic control unit for an engine is constituted by, for example, a microcomputer. In this engine control unit, when, for example, an injecting amount of fuel in compliance with the operational conditions of the engine is calculated, a digital arithmetic operation is executed on the basis of detection signals corresponding to such operational conditions. Accordingly, where the signals indicating such operational conditions are obtained in the form of analog data, they should be converted into digital data by a high precision A/D converter.

Accordingly, if the above-mentioned intake air flowrate measurement output signals are produced, as stated above, in the form of pulse-like signals each having a time width corresponding to a measured value, it is possible to supply such output signals to the control unit as digital data by measuring the time width of said pulse-like signal, by using clock signals. Thus, it becomes possible that such output signals are effectively utilized in the control unit as data for calculating the time length to open a fuel injection valve corresponding to the injecting amount of fuel. This eliminates the necessity of providing an input circuit with an A/D converter.

In an output circuit of the air flowrate measuring apparatus designed to generate the above-mentioned pulse-like measurement output signals, usually, a pulse-like measurement input signal is supplied to a base circuit of the transistors. These transistors amplify the input signal and generate the output signals. That is, an output signal which corresponds to an on or off state of the transistor is supplied to the engine control unit. In such an output circuit, however, the output impedance in an on-state of the transistor becomes greatly different from that in an off-state thereof. Accordingly, when the output signal from such an output circuit is supplied to the control unit, it is necessary, in the control unit, to pass the input signal through a filter circuit to remove noises from the input signal. In this case, however, it becomes difficult to equalize the time constant with respect to an increase in the signal passed through the filter circuit, with respect to a decrease in that signal. Particularly when the transistor is off, the output circuit has high impedance on the measuring-apparatus side of a signal transmission line, so that erroneous signals are very likely to be produced due to ignition noises, radio noises, etc., of the engine.

SUMMARY OF THE INVENTION

In view of the above, an object of the present invention is to provide an air flowrate measuring apparatus with a heat wire in which an air flowrate measurement signal is produced in the form of a pulse-like signal having a time width representing a measured value; and an engine control unit, for example, processes the pulse-like signal to calculate the desired amount of fuel to be injected into the engine.

Another object of the present invention is to provide an air flowrate measuring apparatus with a heat wire in which, an air flowrate measurement signal, i.e., a pulse-like signal, having a time width corresponding to the measured air flowrate, is supplied to an engine control unit via an interface circuit and is precisely processed by the engine control unit, so that an arithmetic operation is performed with high accuracy in compliance with, for example, the operational conditions of the engine.

Still another object of the invention is to provide an air flowrate measuring apparatus which can remove the noise on transmission lines of a measurement signal to set a precise time width in that signal so that the measurement signal containing no noise is supplied to, for example, an engine control unit.

That is, in the air flowrate measuring apparatus according to the present invention, a temperature sensitive element having a temperature-resistance characteristic is disposed within the flow of air whose flowrate is to be measured. To this element there is supplied in a specified cyclic period a heating power whose voltage is specified as a reference voltage by means of a voltage signal from a reference voltage source. When the temperature sensitive element is heated to a specified temperature by the heating power supplied to it, the supply of the heating power is stopped. Thus, a pulse-like signal having a time width equal to the period during which the heating power has been supplied to the element, is generated as a measurement signal. This measurement signal is supplied to the interface circuit via a drive circuit. The output signal of the interface circuit is supplied, as an output measurement signal, to an engine control unit constituted by, for example, a microcomputer. A power source for the drive circuit is provided which includes the reference voltage source. A signal precisely representing the time width of said measurement signal and having a peak level specified as a reference level is supplied to the interface circuit. The interface circuit has a filter function working to reliably remove the noise components from said measurement signal.

When the air flowrate measuring apparatus mentioned above is used to measure the flowrate of air being supplied through a intake pipe to an engine, it generates a pulse-like measurement signal expressing a time width corresponding to such flowrate. The measurement signal is converted by a drive circuit to a pulse-like signal whose peak level is specified as a reference level by the reference voltage source. Accordingly, when such a pulse-like signal is supplied to a filter circuit of the interface circuit and the noise components are removed from it, the integrated waveforms at its the leading and trailing edges are specified and thus unvaried. As a consequence, the width of the input measurement signal is reproduced in a corresponding output signal with high precision by application thereto of predetermined threshold levels. That is, a pulse-like measurement output signal containing no noise component and having the time width of the input pulse-like measurement signal is reliably supplied to the engine control unit. This makes a highly reliable control of the engine possible.

DESCRIPTION OF THE PREFERRED EMBODIMENT

Figure 1:
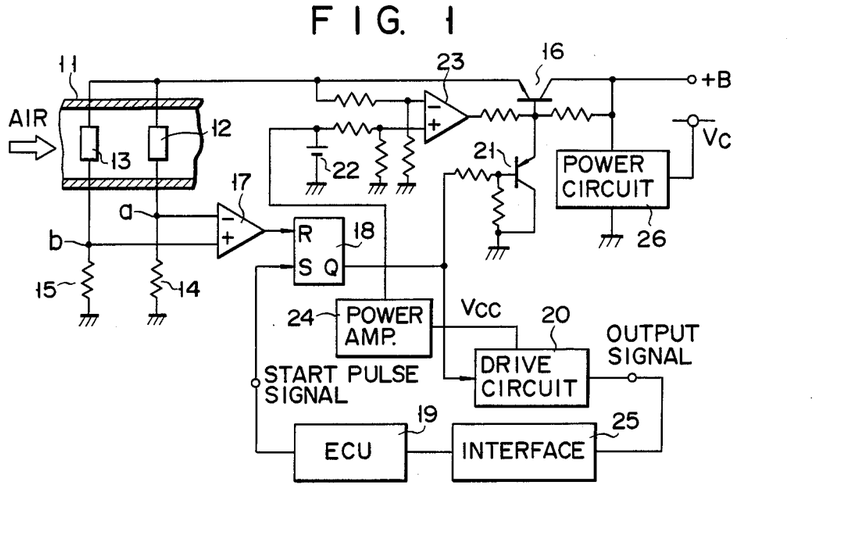
FIG. 1 is a circuit arrangement diagram intended to be used for explaining the construction of a heat-wire type air flowrate measuring apparatus according to an embodiment of the present invention.

FIG. 1 shows the circuit arrangement of an air flowrate measuring apparatus using a heat wire according to an embodiment of the present invention. This air flowrate measuring apparatus is designed to measure, for example, the flowrate of intake air flowing through a intake pipe of an engine.

The intake air which is to be supplied to the engine is allowed to flow through the interior of a intake pipe 11. Within this intake pipe 11 there is disposed a temperature sensitive element 12 which has a temperature-resistance characteristic and which is formed of, for example, a platinum wire. Within the intake pipe 11 there is also disposed an auxiliary temperature sensitive element 13 which is adapted to measure the temperature of the air flowing through the interior of the intake pipe 11, and which is formed of a temperature-resistance element such as, for example, a platinum wire, as in the case of said temperature sensitive element 12. The temperature sensitive element 12 and auxiliary temperature sensitive element 13 are connected at one end, and their other ends are connected with fixed resistors 14 and 15, which are connected to ground. A power supply +B is connected to a connection point between the elements 12 and 13 by a transistor 16. Hence, the elements 12, 13 and the resistors 14, 15 constitutes a bridge circuit.

A connection point a between the temperature sensitive element 12 and the resistor 14, which serves as an output terminal of said bridge circuit, and a connection point b between the auxiliary temperature sensitive element 13 and the resistor 15, which also serves as an output terminal of the bridge circuit, are connected to the input terminals of a comparator 17. In this comparator 17, the voltages at the connection points a and b are compared. When the former voltage is lower than the latter, an output signal is generated. That is, when the temperature of the temperature sensitive element 12 increases by the supply of a heating power thereto and in consequence the air temperature measured by the auxiliary temperature sensitive element 13 becomes higher than a specified temperature, the output signal from the comparator 17 rises. This output signal from the comparator 17 is supplied, as a reset command signal, to a flip-flop circuit 18.

The flip-flop circuit 18 is set by a start pulse signal for measurement which is generated from an engine control unit 19. This start pulse signal is periodically generated and is a signal synchronized with the revolution of the engine. The measurement output signal from this apparatus can thus be effectively utilized in the arithmetic operation for controlling, for example, an injection amount of fuel, an injection timing for fuel, etc.

That is, the flip-flop circuit 18 is set by the start pulse signal synchronized with the engine revolution, and is reset by the output signal from the comparator 17. Thus, the flip-flop circuit 18 produces a pulse like signal in which a time width is represented which corresponds to the duration of this setting or resetting operation. This pulse like signal becomes an air flowrate measurement signal. It is supplied to a drive circuit 20 and, at the same time, is supplied to the base of a transistor 21. The transistor 21 performs an on-off control of the above-mentioned transistor 16 in accordance with its on-off condition. More specifically, when the flip-flop circuit 18 is set, the transistor 21 is turned off and the transistor 16 is turned on. As a result, heating power is supplied to the temperature sensitive element 12. On the other hand, when the flip-flop circuit 18 is reset, said operational state of the transistors is made opposite, and the heating power is no longer supplied to the element 12. In other words, the heating power is supplied or not supplied to the element 12 depending upon whether the flip-flop circuit 18 is set or reset.

The heating power supplied to the temperature sensitive element 12 is set such that its voltage is kept constant. The voltage of this heating power is supplied to an OP (operation) amplifier 23 to which a reference voltage is applied from a reference voltage source 22. The output signal of the operation amplifier 23 controls the base potential of the transistor 16.

Namely, the heating power rises when the flip-flop circuit 18 is set by the start pulse signal, and is supplied to the temperature sensitive element 12. The temperature sensitive element 12 generates heat when the heating power is supplied to it. When the temperature of the sensitive element 12 rises and a specified difference between it and the air temperature measured by the element 13 is obtained, the flip-flop circuit 18 is reset, stopping the supply of the heating power to the element 12. In this case, since the heating power of constant voltage is supplied to the temperature sensitive element 12, the rate at which the temperature of the element 12 rises is influenced by the flow of air acting on the element 12. That is to say, when the flowrate of the air flowing through the intake pipe 11 is high, the amount of heat liberated from the element 12 increases due to such flow of air, so that the rate of increase of the temperature of the element 12 decreases. Accordingly, the time which lasts from the rise of the heating power voltage until the rise of the output signal of the comparator 17, i.e., the pulse width of the output pulse-like signal generated from the flip-flop circuit 18, represents the flowrate of the air flowing through the intake pipe 11.

The pulse-like measurement signal which is generated from the flip-flop circuit 18 when the same is set, is supplied to the drive circuit 20 and thus is taken out as an output measurement signal. In this case, to this drive circuit 20 there is supplied, as a power source voltage, the output signal of a power amplifier 24 to which the voltage signal has been supplied from the reference voltage source 22. Thus, the peak level of the pulse-like output signal of the drive circuit 20 has a specified value, or a reference level. The output measurement signal from the drive circuit 20 is supplied, as an air flowrate detection data signal, to the engine control unit 19 through an interface circuit 25.

A power source circuit 26 is used as a driving source for the comparator 17, the flip-flop circuit 18, etc.

As stated above, the output measurement signal from the air flowrate measuring apparatus is utilized for calculating the injecting amount of fuel, the injection timing for fuel, etc., in the engine control unit 19. The amount of fuel is controlled by changing, the time during which a fuel injection valve is to be opened. That is, the amount of fuel is controlled by a pulse-like signal which is obtained in the same manner as said air flowrate measurement output signal. For this reason, it is necessary to transmit the output pulse-like signal from said measuring apparatus to the engine control unit 19 in a state where such a pulse-like signal is kept sufficiently correct.

For instance, when the engine has six cylinders and is driven at 6000 rpm, the engine revolution synchronization signal corresponding to the start pulse signal is generated at intervals of 3.3 mS. When the time width of the air flowrate measurement output pulse signal is 300 $\mu$S, it must have a tolerance of $\pm 12$ $\mu$S so that the adjusting value of the fuel injection valve may have a tolerance of $\pm 4\%$. When the error producing factors such as temperature variations, apparatus element variations, etc., are taken into consideration, the tolerance for the time width of the output pulse signal must be as small as about $\pm 3\%$. Namely, the output measurement signal of the flip-flop circuit 18 must not be distorted while being supplied to the engine control unit 19.

Figure 2:
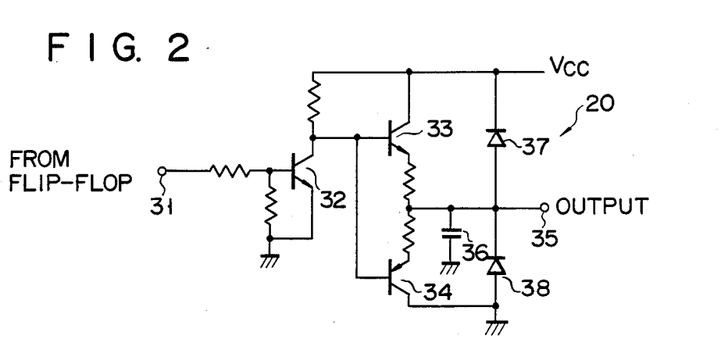
FIG. 2 is a circuit diagram showing an example of a drive circuit which is used in the above-mentioned embodiment.

FIG. 2 shows the construction of the drive circuit 20 which satisfies the above-mentioned requirements. In this drive circuit 20, the output signal of the flip-flop circuit 18, or the pulse-like measurement signal, is supplied through an input terminal 31 to the base of a first transistor 32. This first transistor 32 is turned on when the flip-flop circuit 18 is set. The transistor 32 outputs a signal at logic level of "1". The output signal obtained from a collector circuit of the transistor 32 is supplied to the bases of second and third transistors 33 and 34, which are NPN and PNP types. Hence, the second transistor 33 is turned off and the third transistor 34 on. When the first transistor 32 is turned off, the transistors 33, 34 are turned on and off, respectively.

The transistors 33, 34 are connected in series to a source of voltage Vcc set by the power amplifier 24 and are supplied with a drive voltage in a symmetrical form. A connection point between these transistors 33 and 34 is connected to an output terminal 35. A capacitor 36 constitutes a filter circuit for removing the noise components overlapped upon the output signal, and diodes 37 and 38 are used for protection against overvoltage.

In the drive circuit 20, when the input signal at logic level "1" is supplied to the input terminal 31, the first transistor 32 is turned on, thus tuning the transistors 33 and 34 off and on. Conversely, when the input signal has a logic level of "0", the transistors 33, 34 are turned on and off. That is, one of the second and third transistors 33, 34 is turned on, while the other off, whichever logic level of "1" or "0" the input signal may have.

For this reason, it is possible to provide a sufficiently small ignition signal on-off signal for a solenoid device, and noise signals due to electrostatic induction and electromagnetic induction, etc., which are overlapped in their relay operation, etc., with respect to the transmission lines for the output signal from the drive circuit 20. Besides, in any above-mentioned case, it is possible to make the output impedances low and equal.

Figure 3:
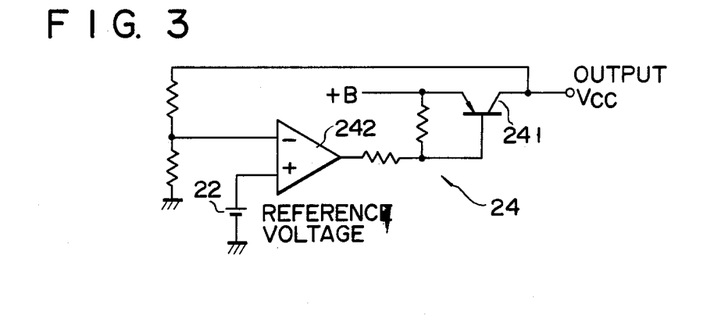
FIG. 3 is a circuit diagram of a power amplifying circuit which constitutes a power source circuit used with respect to said drive circuit.

FIG. 3 shows a circuit, as an example, of the power amplifier 24 constituting the power source circuit for the drive circuit 20. In this power source circuit, a power source +B is taken out through a transistor 241 to thereby obtain an output voltage Vcc. A base circuit of the transistor 241 is controlled by the output signal of an OP (operational) amplifier 242, to which the output voltage from the reference voltage source 22 is supplied. The output voltage Vcc is divided by a resistor circuit and is then supplied to the OP amplifier 242 so as to maintain the output voltage. This output voltage Vcc is used as the voltage source of the drive circuit 20 shown in FIG. 2.

In the engine control unit 19, the time width of the pulse-like measurement input signal is correctly measured. The time width is used as intake air flowrate measurement data to calculate the injecting amount of fuel, the injection timing, etc. Therefore, when the measurement input signal contains noises, the air flowrate measurement data cannot be correct. In this apparatus, the interface circuit 25 serves to obtain measurement data having no noise component. The circuit 25 has a filter function for removing the noise components. More specifically, it is designed to integrate, by specified time constants, the leading and trailing ends of the pulse-like measurement output signal from the drive circuit 20. Namely, in the interface circuit 25, threshold levels are set with respect to the leading and trailing edges of the pulse-like measurement output signal, so that the time width of the measurement output signal may be reproduced in the integrated waveform of this output signal.

In this case, by suitably selecting the threshold levels with respect to the leading and trailing portions of the pulse-like measurement output signal respectively, the circuit 25 generates an output pulse-like signal with its leading and trailing edges delayed by periods t1 and t2 from those of the output signal. Thus, the time width of the input measurement signal, representing the measured air flowrate, is made equal to the time width of the output measurement signal, by setting such that t1 =t2.

However, where the interface circuit 25 is used, the following problem may occur. That is, if the peak level of the input pulse-like signal to the circuit 25 is varied relative to said threshold levels due to the variations in the circuit impedance, power source voltage, etc., the periods t1 and t2 will also vary, making it impossible to set the relation of t1 =t2 correctly. In other words, the output signal does not correctly express the time width of the input pulse-like signal.

Figure 4:
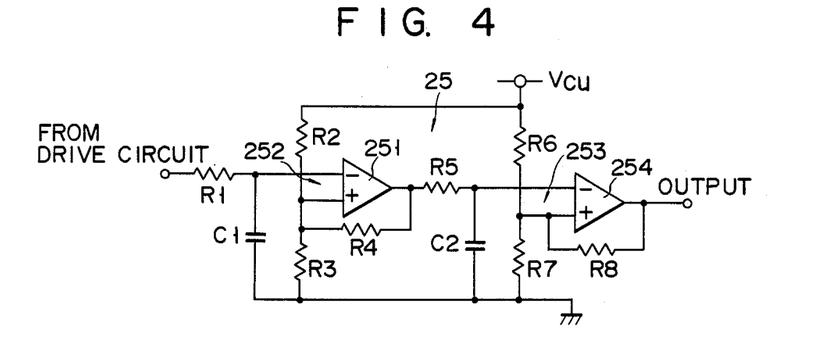
FIG. 4 is a circuit diagram showing an example of an interface circuit to which the output signal from said drive circuit is supplied.

FIG. 4 shows an example of the interface circuit 25. In this interface 25, an input pulse-like signal (FIG. 5A) is inputted from the drive circuit 20 through a first filter circuit consisting of a resistor R1 and capacitor C1. The signal is supplied to an OP (operation) amplifier 251. To the OP amplifier 251, there is supplied a reference voltage prepared by dividing the source voltage Vcu by resistors R2 and R3. A feedback resistor R4 is set with respect to this OP amplifier 251. The first filter circuit and said OP amplifier 251 constitute a first wave-shaping circuit 252. The source voltage Vcu is supplied from a stabilizing power source of the engine control unit 19 in order that the interface circuit 25 may be subordinated to this engine control unit 19.

Figure 5A:
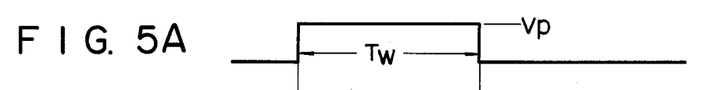
FIGS. 5A to 5E show the signal waveforms which are intended to be used for explaining the operational conditions of said interface circuit.
Figure 5B:
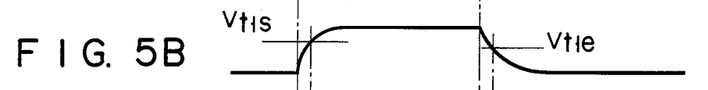
Figure 5C:
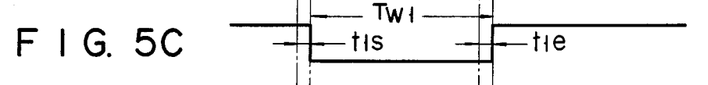

When a pulse-like signal (FIG. 5A) having a time width of Tw is inputted, the output signal from the first filter circuit rises and falls in accordance with a time constant as shown in FIG. 5B. By setting threshold levels Vt1s and Vt1e with respect to said output signal, the first wave-shaping circuit 252 generates a signal having such a waveform as shown in FIG. 5C.

This output signal has a pulse-like waveform whose leading edge is delayed by a period tls from that of the input signal waveform and whose trailing edge is delayed by period length tle from that of the input waveform. By suitably setting the threshold levels Vt1s and Vt1e, the time widths Tw1 and Tw of the output and input waveforms are made equal.

The voltage Vp of the input waveform is likely to vary depending upon the conditions such as impedance of the transmission circuits for this input signal, or the stability of the source voltage involved. If the voltage Vp varies, the integration curve of the filter circuit will vary. When the integrating time constant is large, periods t1s and t1e vary in spite of the constant threshold levels Vt1s and Vt1e. Accordingly, the time width Tw1 of the output waveform also varies and is not equal to period Tw of the input waveform. The measurement signal to be supplied to the engine control unit 19 is inevitably incorrect.

Accordingly, in the first wave-shaping circuit 252, the filter circuit has a sufficiently small time constant so that period t1s or t1e may not vary, even when the voltage Vp of the input waveform is ordinarily varied. By so doing, the time width of the output signal of the first wave-shaping circuit 252, whose waveform is shown in FIG. 5C, coincides with that of the input signal thereto. Further, the voltage Vp of said output signal is stabilized in accordance with the source voltage of the interface circuit 25.

The pulse-like signal is supplied from the first wave-shaping circuit 252 to a second filter circuit constituting the second wave-shaping circuit 253. This second filter circuit comprises a resistor R5 and a capacitor C2. The output signal therefrom of this circuit is supplied to an OP (operation) amplifier 254. The reference voltage determined by resistors R6 and R7 is applied to the OP amplifier 254. Further, a feedback resistor R8 is connected to the OP amplifier 254.

The integrating time constant of the second filter circuit is set at a value which is sufficient to eliminate the noise components contained in the input signal.

Figure 5D:
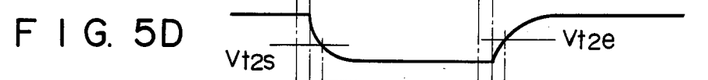

When the output signal (FIG. 5C) of the first wave-shaping circuit 252 is supplied to the second wave-shaping circuit 253, its waveform is integrated in the second filter circuit portion. Hence, a signal having the waveform shown in FIG. 5D is inputted to the OP amplifier 254.

Figure 5E:
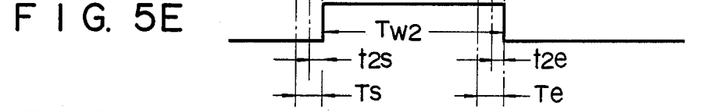

When the threshold levels Vt2s and Vt2e have been set in the OP amplifier 254, the second wave-shaping circuit 253 outputs a signal having the waveform shown in FIG. 5E. In this waveform signal, the periods t2s and t2e are equalized by selecting proper values for the threshold levels Vt2s and Vt2e.

The peak voltage of the signal (FIG. 5C) inputted to the second wave-shaping circuit 253 is not affected by the peak voltage Vp of the input pulse-like signal shown in FIG. 5A. It is kept constant by the source voltage Vcu with respect to this circuit portion Accordingly, even when the second filter circuit has a large integrating time constant, periods t2s and t2e can be made equal by properly determining the threshold levels Vt2s and Vt2e. Accordingly, the time width Tw1 (FIG. 5C) inputted to the second wave-shaping circuit 253 comes to coincide with the time width Tw2 of the output signal shown in FIG. 5E. That is, the delay time Ts (=t1s +t2s) from the leading edge of an input signal (see FIG. 5A) to the interface circuit 25 to the leading edge of an output signal (see FIG. 5E) which is delivered from the interface circuit 25 becomes equal to a delay time Te (=t1e +t2e) from the trailing edge of the input signal to the interface circuit 25 to the trailing edge of the output signal thereof. As a result, an output measurement signal which correctly reproduces the time width expressed in the input measurement signal is obtained from the interface circuit 25.

Assume now that, in this interface circuit 25, the source voltage Vcu prepared therefor has been varied in level. Then, when the source voltage Vcu rises, period t1s becomes longer, at the same time, period t2s becomes shorter. When period t1e becomes shorter, period t2e becomes longer. In consequence, the pulse width of the output signal is prevented from decreasing despite the variation in level of the source voltage Vcu.

Accordingly, the time width of any measurement signal from the flip-flop circuit 18, which corresponds to the measured air flowrate, is effectively expressed by the drive circuit 20. The peak level of the signal is stably controlled by the circuit 20. The processed signal is delivered as an output measurement signal. The output measurement signal is supplied to the engine control unit 19 through the interface circuit 25. More specifically, this signal supplied to the engine control unit 19 has no noise components, and the time width of this signal correctly represents the time width of the pulse-like signal generated from the flip-flop circuit 18. Thus, the highly precise air flowrate measurement data is supplied to the engine control unit 19.

Figure 6:
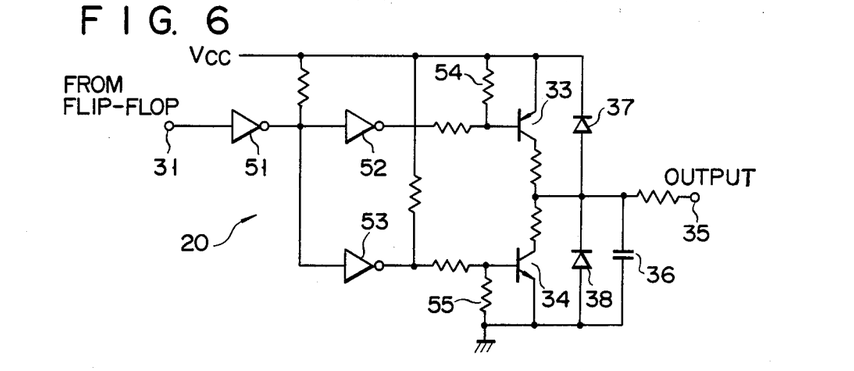
FIG. 6 is a circuit diagram showing another example of said drive circuit.

FIG. 6 shows another example of the drive circuit 20 to which the output signal from the flip-flop circuit 18 is supplied. In this drive circuit 20, a pulse-like signal supplied to an input terminal 31 is inverted by a first inverter 51. The inverted signal is supplied in parallel to second and third inverters 52 and 53. The output signals of the inverters 52 and 53 are supplied, as control signals, to transistors 33 and 34. The base bias voltages which are specified through resistors 54 and 55 are supplied to these transistors 54 and 55, respectively.

The inverters 51 to 53 may be a circuit similar to that which constitutes the first transistor 32 portion of the drive circuit 20 shown in FIG. 2.

In the drive circuit having this construction, a high-level portion of the pulse-like signal can be expressed as being higher than in the case of the preceding drive circuit 20, and a low-level portion thereof can be expressed as being lower than in the case of the preceding drive circuit 20. That is, it is possible to make the noise margin larger than in the preceding case. Accordingly, the undesirable effect of the noise signals can be removed more effectively.

Figure 7:
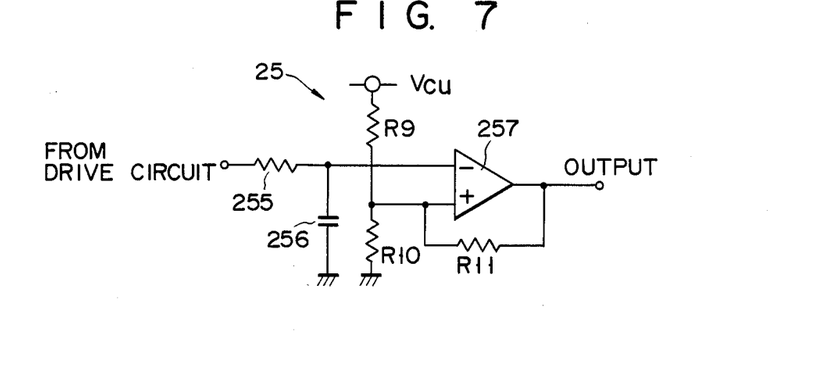
FIG. 7 is a circuit diagram showing another example of said interface circuit.

FIG. 7 shows another example of the interface circuit 25. In this interface circuit, the output signal of the drive circuit 20 is integrated by an integration circuit comprised of a resistor 255 and a capacitor 256 and is supplied to an inverting input terminal of a comparator 257. A comparing reference voltage determined by resistors R9, R1O and R11 is supplied to the non-inverting input terminal of this comparator 257.

Figure 8A:
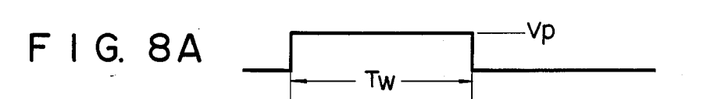
FIGS. 8A to 8C show the signal waveforms which are intended to be used for explaining the operational conditions of the interface circuit shown in FIG. 7.
Figures 8B, 8C:
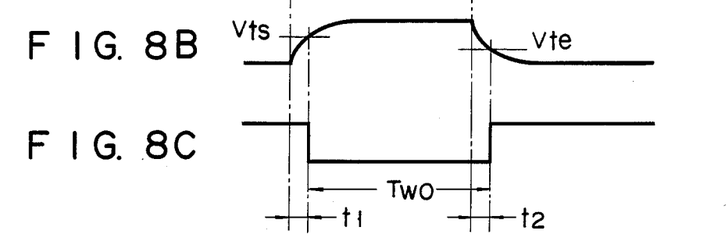

That is, when the input signal having time width Tw (FIG. 8A) is supplied to this interface circuit 25 from the drive circuit 20, its leading and trailing edges are integrated. The input signal comes to have a waveform shown in FIG. 8B. When suitable threshold levels Vts and Vte are set with respect to such an integrated waveform, the output signal from the comparator 257 comes to have the waveform shown in FIG. 8C. That is, a signal whose leading and trailing edges are delayed by periods t1 and t2 from the leading and trailing edges of the input waveform, and which resultantly has a time width of Two, is taken out from the interface circuit 25.

Since the output pulse-like signal from the drive circuit 20 driven by the source voltage stabilized by the reference voltage source 22 is inputted into the interface circuit 25, the peak voltage Vp of the pulse-like signal (FIG. 8A) is kept stable. Accordingly, periods t1 and t2 are stably set with the use of the threshold levels Vts and Vte, whereby both time widths Tw and Two can be allowed to coincide with each other.

Figure 9:
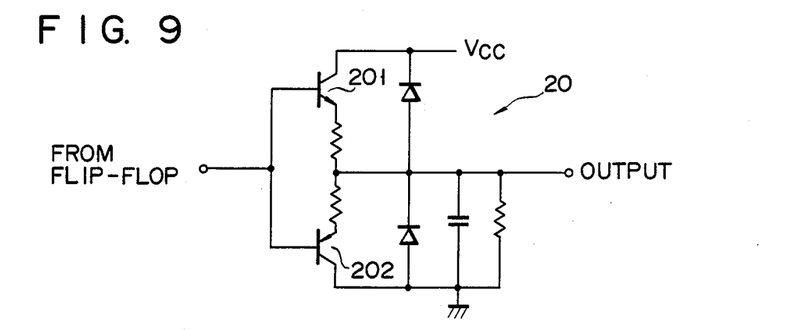
FIG. 9 is a circuit diagram showing still another example of said drive circuit.

FIG. 9 shows still another example of the drive circuit 20. This example is constructed such that it operates in a push-pull manner with the use of paired transistors 201 and 202. Further, the output signal from the power amplifier 24 is used as the power source Vcc for this push-pull circuit. The pair of transistors 201 and 202 are driven in accordance with the rise and fall of the pulse-like measurement signal from the flip-flop circuit 18, and the output signal in which the time width of the input measurement signal is correctly reproduced is taken out from this drive circuit, and this output signal is supplied to the next stage of interface circuit 25.

What is claimed is:

1. A hot wire type air flowrate measureing apparatus comprising:

a temperature sensitive element which is constituted by a resistor having a temperature characteristic in which its resistance value varies with respect to temperature, and which is disposed within the flow of air desired to be measured;

a measurement commencement controlling means which controls the rising of a heating power supplied to, said temperature sensitive element in response to a start signal generated in a specified cyclic period;

a temperature sensing means which senses the temperature of said temperature sensitive element supplied with said heating power and generates a detection signal when the temperature of said temperature sensitive element rises to a specified value, to thereby stop the supply of said heating power;

a reference voltage setting means which has a reference voltage source to set the voltage of the heating power supplied to said temperature sensitive element to a specified constant voltage;

a meansurement signal generating means which generates a pulse-like measurement signal representing a time width corresponding to the time width for supplying the heating power to said temperature sensitive element;

a drive circuit which generates an output pulse-like measurement signal in which there is expressed a time width corresponding to the time width of the measurement signal generated from said measurement signal generating means, said drive circuit including first and second transistors one of which is turned on when the other is turned off in response to the pulse-like measurement signal generated from said measurement signal generating means, said first and second transistors being connected in series to a voltage source and an output measurement signal being taken out from a point of connection between said first and second transistors; and an interface circuit to which the pulse-like output signal from said drive circuit is supplied and which is constructed such that it contains a filter function for removing the noise components contained in that input signal, and which generates an output pulse-like air flowrate measurement signal in which there is reproduced said time width of the input signal.

2. An apparatus according to claim 1, wherein said drive circuit is constructed in such a manner as to include the first and second transistors one of which is turned on when the other is turned off in response to the pulse-like measurement signal generated from said measurement signal generating means, said first and second transistors being connected in series to a voltage source which is constructed in such a manner as to include a reference voltage source constituting said reference voltage setting means.

3. An apparatus according to claim 1, further comprising an engine control unit to which the output signal from said interface circuit is supplied as an intake air flowrate measurement signal, and which is an electronic circuit including a microcomputer.

4. An apparatus according to claim 1, wherein said engine control unit includes a stabilizing voltage source, which supplies its stabilized source voltage to the interface circuit as a source voltage for setting threshold levels used for wave-shaping operations.

5. A hot wire type air flowrate measuring apparatus comprising:

a temperature sensitive element which is constituted by a resistor having a temperature characteristic in which its resistance value varies with respect to temperature, and which is disposed within the flow of air desired to be measured;

a measurement commencement controlling means which controls the rising of a heating power supplied to said temperature sensitive element in response to a start signal generated in a specified cyclic period;

a temperature sensing means which senses the temperature of said temperature sensitive element supplied with said heating power and generates a detection signal when the temperature of said temperature sensitive element rises to a specified value, to thereby stop the supply of said heating power;

a reference voltage setting means which has a reference voltage source to set the voltage of the heating power supplied to said temperature sensitive element to a specified constant voltage;

a measurement signal generating means which generates a pulse-like measurement signal representing a time width corresponding to the time width for supplying the heating power to said temperature sensitive element;

a drive circuit which generates an output pulse-like measurement signal in which there is expressed a time width corresponding to the time width of the measurement signal generated from said measurement signal generating means; and an interface circuit to which the pulse-like output signal from said drive circuit is supplied and which is constructed such that it contains a filter function for removing the noise components contained in that input signal, and which generates an output pulse-like air flowrate measurement signal in which there is reproduced said time width of the input signal;

said interface circuit including a first wave-shaping means having a first filter means having a time constant small enough to allow the variation in level of the input signal, and a second wave-shaping means having a second filter means to which the output signal from said first wave-shaping means is supplied and which has a time constant large enough to remove the noise components.

6. An apparatus according to claim 5, wherein said first and second wave-shaping means constituting said interface circuit have threshold levels determined by a stabilized source voltage, respectively.

7. A hot wire type air flowrate measuring apparatus comprising:

a temperature sensitive element which is constituted by a resistor having a temperature characteristic in which its resistance value varies with respect to temperature, and which is disposed within the flow of air desired to be measured;

a measurement commencement controlling means which controls the rising of a heating power supplied to said temperature sensitive element in response to a start signal generated in a specified cyclic period;

a temperature sensing means which senses the temperature of said temperature sensitive element supplied with said heating power and generates a detection signal when the temperature of said temperature sensitive element rises to a specified value, to thereby stop the supply of said heating power;

a reference voltage setting means which has a reference voltage source to set voltage of the heating power supplied to said temperature sensitive element to a specified constant voltage;

a measurement signal generating means which generates a pulse-like measurement signal representing a time width corresponding to the time width for supplying the heating power to said temperature sensitive element;

a drive circuit which generates an output pulse-like measurement signal in which there is expressed a time width corresponding to the time width of the measurement signal generated from said measurement signal generating means; and an interface circuit to which the pulse-like output signal from said drive circuit is supplied and which is constructed such that it contains a filter function for removing the noise components contained in that input signal, and which generates an output pulse-like air flowrate measurement signal in which there is reproduced said time width of the input signal;

said drive circuit including first and second transistors one of which is turned on when the other is turned off in response to the pulse-like measurement signal generated from said measurement signal generating means, said first and second transistors being connected in series to a voltage source, and an output measurement signal being taken out from a connection point between said first and second transistors;

said interface circuit, to which the output signal from said drive circuit is supplied, including a first wave-shaping means having a first filter means having a time constant small enough to allow a variation in the level of the input signal, and a second wave-shaping means having a second filter means to which the output signal from said first wave-shaping means is supplied and which has a time constant large enough to remove the noise components.

8. An apparatus according to claim 7, further comprising an engine control unit to which the output signal from said interface circuit is supplied as an intake air flowrate measurement signal, and which is an electronic circuit including a microcomputer.

9. An apparatus according to claim 7, wherein said first and second transistors connected in series to constitute said drive circuit are connected to a power source circuit including a reference voltage source constituting said reference voltage setting means.

10. An apparatus according to claim 7, wherein said first and second wave-shaping means constituting said interface circuit have threshold levels determined by a stabilized source voltage, respectively.

11. A hot wire type air flowrate measuring apparatus comprising:

a temperature sensitive element which is constituted by a resistor having a temperature characteristic in which its resistance value varies with respect to temperature, and which is disposed within the flow of air desired to be measured;

a measurement commencement controlling means which controls the rising of a heating power supped to said temperature sensitive element in response to a start signal generated in a specified cyclic period;

a temperature sensing means which senses the temperature of said temperature sensitive element supplied with said heating power and generates a detection signal when the temperature of said temperature sensitive element rises to a specified value, to thereby stop the supply of said heating power;

a reference voltage setting means which has a reference voltage source to set the voltage of the heating power supplied to said temperature sensitive element to a specified constant voltage;

a measurement signal generating means which generates a pulse-like measurement signal representing a time width corresponding to the time width for supplying the heating power to said temperature sensitive element; and a drive circuit including first and second transistors one of which is turned on when the other is turned off in response to the pulse-like measurement signal generated from said measurement signal generating means, said first and second transistors being connected in series to a voltage source, said drive circuit generating an output pulse-like measurement signal in which there is expressed a time width corresponding to the time width of the measurement signal generated from said measurement signal generating means.

12. An apparatus according to claim 11, wherein said voltage source connected to said drive circuit includes the reference voltage source constituting said reference voltage setting means.

13. An apparatus according to claim 11, wherein said output pulse-like measurement signal generated by said drive circuit is taken out from a point of connection between said first and second transistors.

14. An apparatus according to claim 13, wherein said voltage source connected to said drive circuit includes the reference voltage constituting said reference voltage setting means.

15. An apparatus according to claim 11, further comprising an engine control unit to which the output signal from said drive circuit is supplied as an intake air flowrate measurement signal, and which includes a microcomputer.

16. A hot wire type air flowrate measuring apparatus comprising:

a temperature sensitive element which is constituted by a resistor having a temperature characteristic in which its resistance value varies with respect to temperature, and which is disposed within the flow of air desired to be measured;

a measurement commencement controlling means which controls the rising of a heating power supplied to said temperature sensitive element in response to a start signal generated in a specified cyclic period;

a temperature sensing means which senses the temperature of said temperature sensitive element supplied with said heating power and generates a detection signal when the temperature of said temperature sensitive element rises to a specified value, to thereby stop the supply of said heating power;

a reference voltage setting means which has a reference voltage source to set the voltage of the heating power supplied to said temperature sensitive element to a specified constant voltage;

a measurement signal generating means which generates a pulse-like measurement signal representing a time width corresponding to the time width for supplying the heating power to said temperature sensitive element; and an interface circuit to which the pulse-like measurement signal from said measurement signal generating means is supplied and which includes a first wave-shaping means having a first filter means having a time constant small enough to allow the variation in level of the input signal, and a second wave-shaping means having a second filter means to which the output signal from said first wave-shaping means is supplied and which has a time constant large enough to remove the noise components, and which generates an output pulse-like air flowrate measurement signal in which there is reproduced said time width of the input signal.

17. An apparatus according to claim 16, wherein said first and second wave-shaping means constituting said interface circuit have threshold levels determined by a stabilized source voltage.

18. An apparatus according to claim 17, further comprising an engine control unit to which the output signal unit from said interface circuit is supplied as an intake air flowrate measurement signal, and which includes a microcomputer.

19. An apparatus according to claim 18, wherein said engine control unit includes a stabilizing voltage source, which supplies its stabilized source voltage to the interface circuit as a source voltage for setting the threshold levels used for wave-shaping operations.

20. An apparatus according to claim 16, further comprising an engine control unit to which the output signal from said interface circuit is supplied as an intake air flowrate measurement signal, and which includes a microcomputer.

* * * * *